(No Model.) 4 Sheets—Sheet 4.
J. C. BALLEW.
SAW FILING MACHINE.
No. 551,708. Patented Dec. 17, 1895.
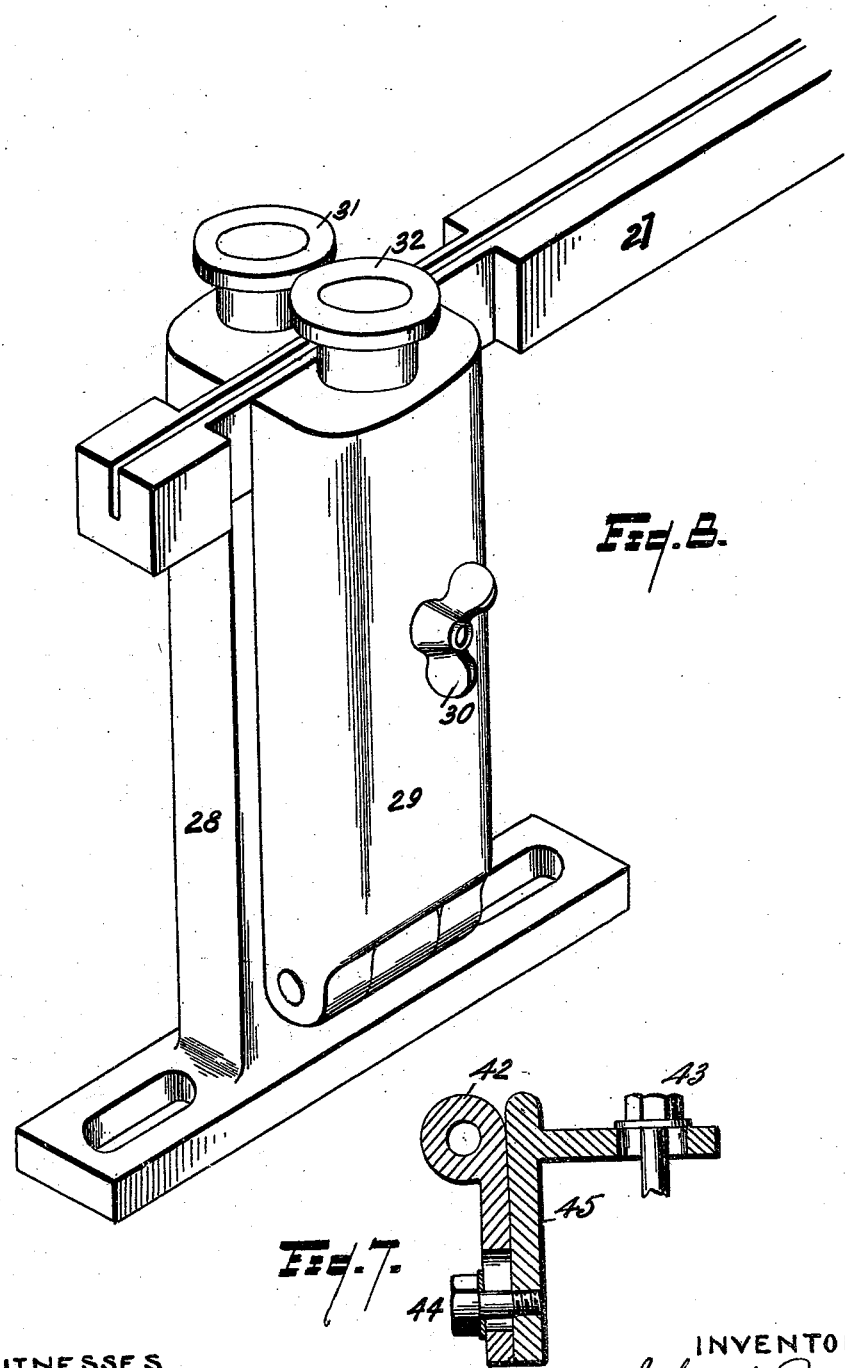

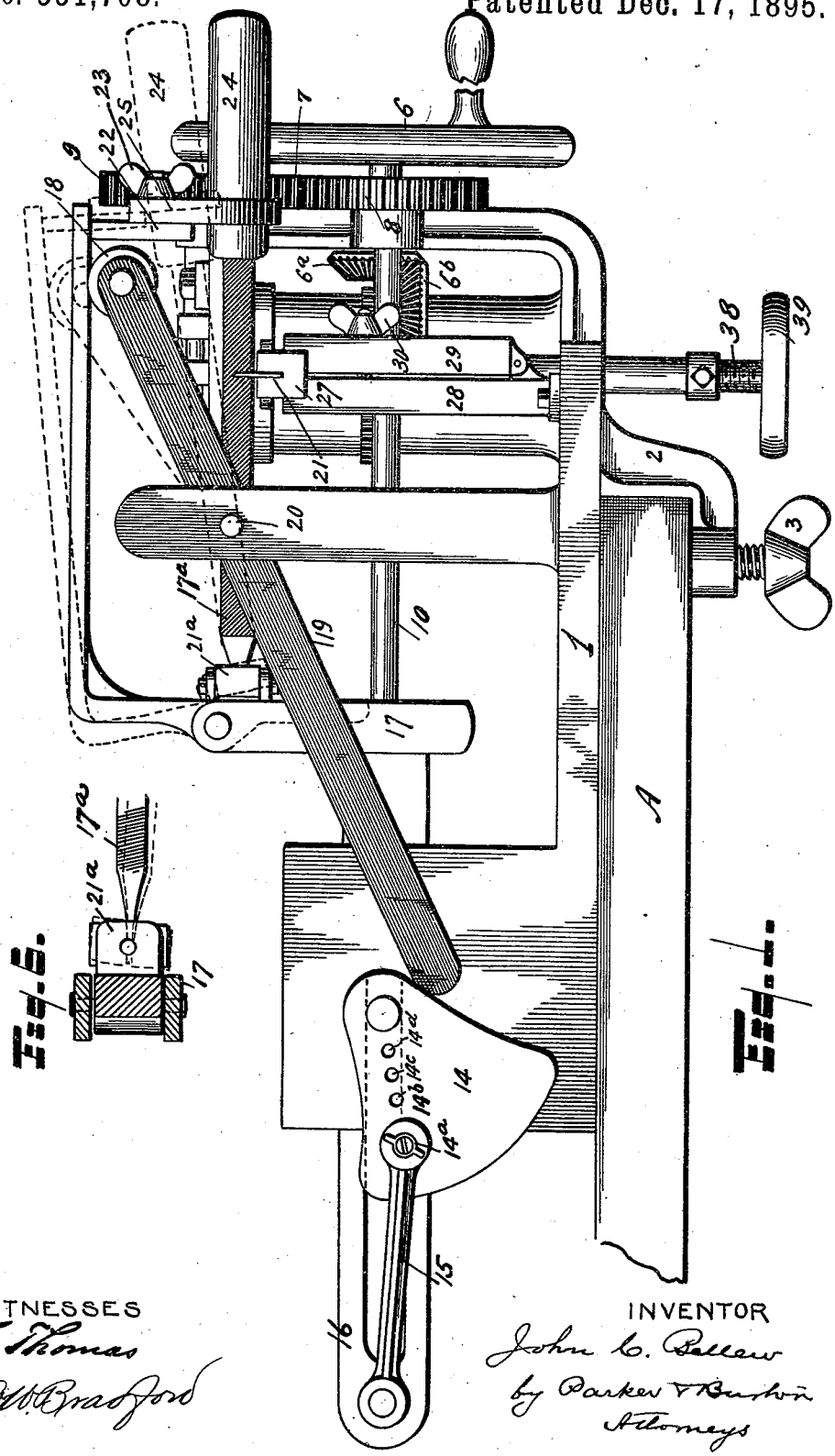

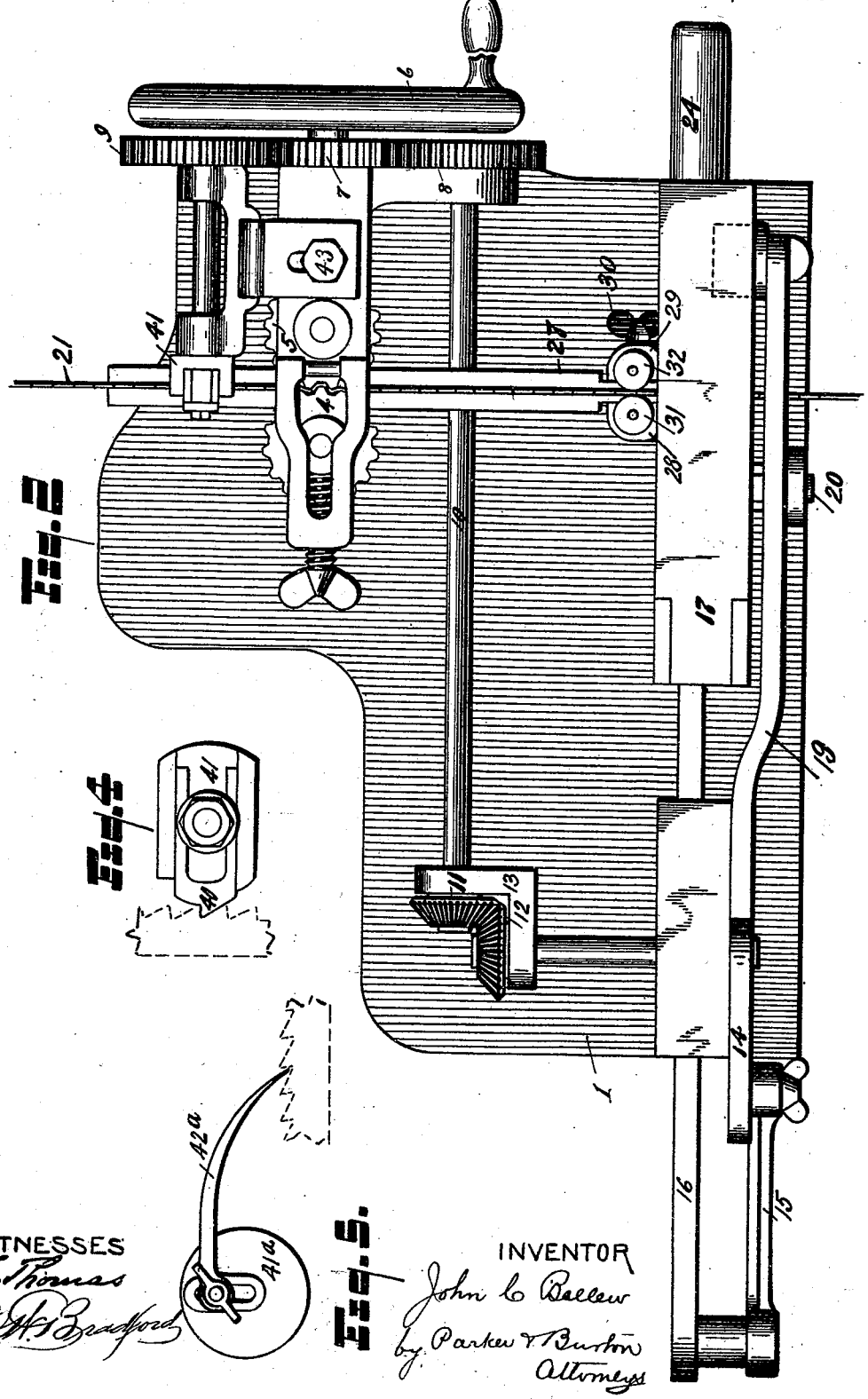

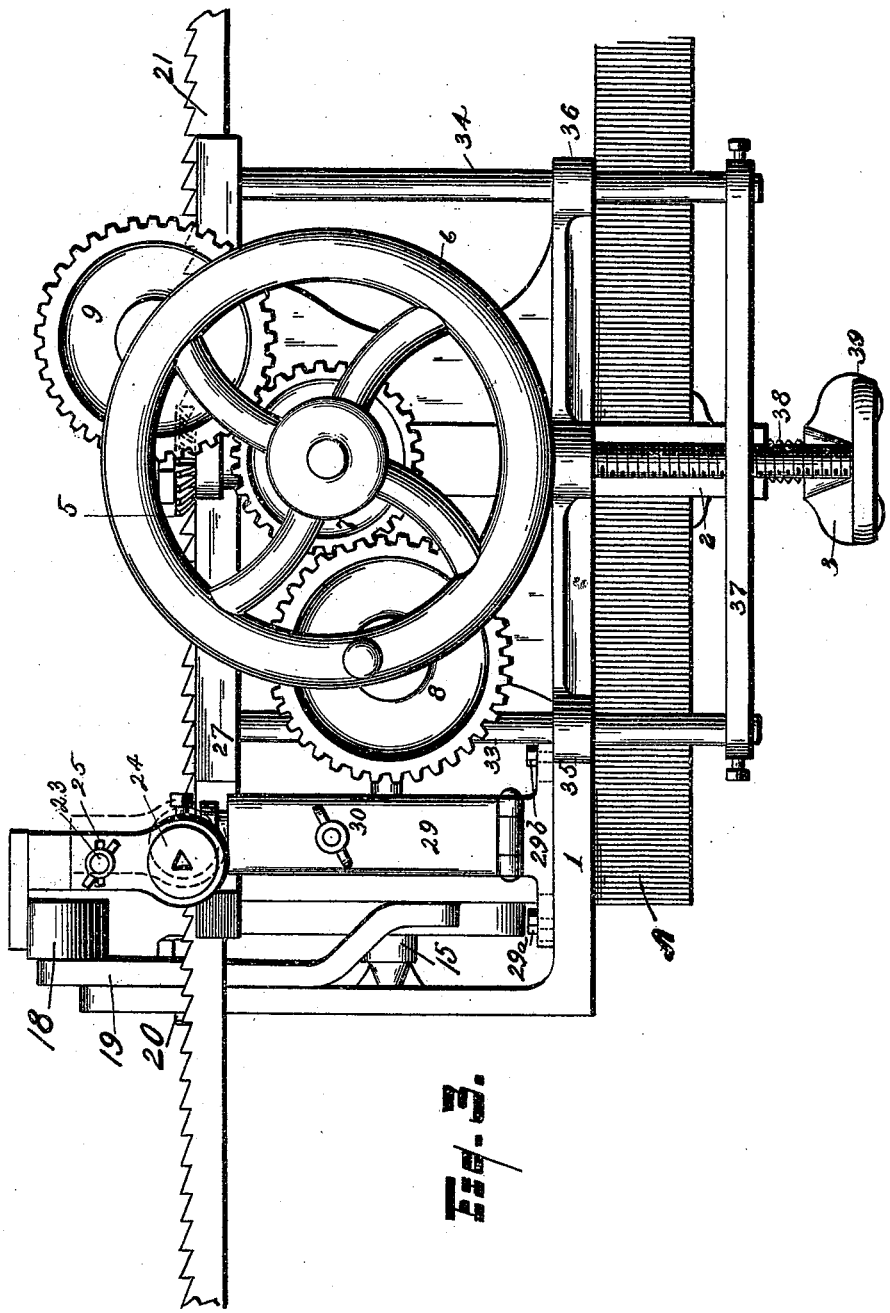

UNITED STATES PATENT OFFICE.

JOHN C. BALLEW, OF EVANSVILLE, INDIANA, ASSIGNOR OF ONE-HALF TO THE FRONTIER IRON WORKS, OF DETROIT, MICHIGAN.

SAW-FILING MACHINE.

SPECIFICATION forming part of Letters Patent No. 551,708, dated December 17, 1895.

Application filed September 20, 1894. Serial No. 523,539. (No model.)

*To all whom it may concern:*

Be it known that I, JOHN C. BALLEW, a citizen of the United States, residing at Evansville, county of Vanderburg, State of Indiana, have invented a certain new and useful Improvement in Saw-Filing Machines; and I declare the following to be a full, clear, and exact description of the invention, such as will enable others skilled in the art to which it pertains to make and use the same, reference being had to the accompanying drawings, which form a part of this specification.

This invention relates to saw-filing machines of the class in which a file is carried across the saw by means of an arm provided with a rectilinear motion and the saw is fed forward under the file during each backward stroke of the file, both of the motions receiving their origin primarily from the single rotating driving-wheel, the amount of forward feed being regulated at will so that the file may be used to sharpen each tooth or each alternate tooth or teeth at greater intervals if desired. It is my intention to use this filing-machine in connection with my saw-setting machine for which Letters Patent were granted to me on November 29, 1887, No. 374,032, employing the same driving-wheel, and arranging the filing and setting machines in such relation to each other that they work in conjunction; yet, just as my setting-machine was independent, so the filing-machine is capable of entirely independent action. This machine can be adapted to be operated either by hand or by power, as may be desired.

In the drawings, Figure 1 is an end view of the machine, showing it as seen at the bottom of Fig. 2. Fig. 2 is a plan view. Fig. 3 is a front view as seen from the right of Fig. 2. Fig. 4 is a detail showing the feed-wheel. Fig. 5 shows a modification of the feed-wheel. Fig. 6 is a plan view of the device employed to hold the tang in the file. Fig. 7 is a section showing the support in which is held the arbor of the feed-wheel. Fig. 8 is a perspective showing the vise in which the saw is held under the file.

A indicates a support or table to which the machine is clamped.

1 indicates the bed of the machine.

2 indicates a clamped arm, and 3 indicates a clamp-screw, by means of which the machine is clamped to the table A.

From the bed-plate 1 rise two posts, on which are mounted the rotary setting-heads 4 and 5. These setting-heads are geared together to receive their motion primarily from the main driving-wheel 6, on the shaft of which is a bevel-gear $6^a$ meshing with the bevel-gear $6^b$, which is on the shaft of one of the setting-heads. The driving-wheel 6 is journaled in an arm that rises from the plate 1, and on the shaft of this wheel 6 is a gear 7 that meshes with two pinions 8 and 9, one of which, 9, actuates the feed-wheel, and will be described hereinafter; the other of which, 8, actuates the reciprocating mechanism that carries the file, and will now be described.

The shaft 10 of the wheel 8 has at its rear end a miter-gear 11, that meshes with the miter-pinion 12, and both of these pinions are supported on a strut 13, which rises from the main bed-plate. To the shaft of the pinion 12 is secured a cam 14, and upon the face of the cam are a number of holes $14^a$, $14^b$, $14^c$, and $14^d$, into the upper one of which is inserted the wrist-pin of a crank-pitman 15. That one of these holes is selected which will give to the reciprocating pitman 16 the motion proper to the file which is to be used, inasmuch as the distance of reciprocation of the pitman 16 varies according to the hole which is selected. As the cam 14 revolves, the pitman 15 reciprocates the sliding pitman 16, and this sliding pitman 16 forms the stem of the file-frame 17. The sliding pitman 16 is slotted in order that it may have its line of motion cutting the axis of the shaft of the pinion 12, and it is guided in horizontal guides lying above and beneath it. The front end of the file-frame is guided over a friction-roller 18, that is itself mounted on the end of a swinging bar 19, the rear end of which bar engages with the cam 14, and the bar swings on a pin 20. The engagement between the cam 14 and the bar 19 is adjusted so that during the forward motion of the frame 17 and the file $17^a$ the file rests with its own weight and the weight of the forward part of the frame on the saw-blade 21, and during the back stroke of the frame and the file the rear end of the bar 19 is pressed downward, and the forward end rises and lifts the file out of engagement with the saw. The forward end of the file-frame is hinged to the sliding pitman 16 to permit the motion just described. The file-frame is provided with means for setting the file either straight across the saw or raking with respect to the saw, so as to file either straight or raking. The attachments through which this result is accomplished are seen best in Fig. 1, where 21ª indicates a block into which is received the tang of the file. This block is swiveled to the file-frame and has a slight rotary motion on its vertical axis. At the front of the frame is a hanger 22, upon which is held by a set-screw 23 an adjustable piece 25, through which is a hole, and through the hole passes the holder 24 that holds the front end of the file. The hole and the holder passing through it are round, and the holder is adjustable on its axis, and when in adjustment is secured in place by a set-screw. The sliding piece 25 is movable either to the right or the left, and its position determines the position of the front end of the file.

In action the file has four motions: First, it moves forward horizontally, doing work as it moves forward. The front end then rises, the entire file swings forward, the rear end rising slightly and the front end rising considerably, and the frame carrying the file in its present oblique position next moves backward. The file then drops to its horizontal position ready for another forward stroke.

The saw under work is held firmly against side vibration, but can move forward under the raking pressure of the file during the forward motion of the file, and during the backward motion of the file the saw is fed forward either one or two or more teeth, as may be provided for. The holding mechanism consists of a support on which the back of the saw-blade rests and a vise or grip which engages the saw directly below the file. The rest consists of a grooved track or guide 27 that extends from behind the feed-wheel forward beyond the file-holding frame. Directly under the path of the file is a vise with a fixed jaw 28 and a loose jaw 29 which is actuated by a screw and lever 30. The guide 27 rests loosely between the upper ends of the jaws 28 29, and between these jaws a portion of the guide is cut away to permit of the engagement of the extreme upper ends of the jaws with the saw-blade. On the extreme upper end of each jaw is a friction-roller 31 32, and these rollers form the gripping-surface of the jaw and are arranged to grip the saw-blade directly under the file and below the saw-teeth. When the file is set raking, the position of the vise is changed by setting it along the bed-plate to which it is held by screws 29ª 29ᵇ, that pass into the bed-plate through slots in the brackets at the bottom of the vise. The saw-guide 27 is adjustable vertically, so that various widths of saws may be treated and so that the proper cut of the file on the saw may at all times be regulated. The saw-guide is the upper horizontal piece of a frame of which the two upright or side pieces 33 34 pass through eyes in lugs 35 36 on the bed-piece. The frame is completed by the bottom cross-bar 37, and this is secured to the two uprights 33 34 by set-screws, and centrally through it passes an adjusting-screw held by swivel connection to the bed 1 and provided at its lower end with a hand-wheel 39. The rotation of the screw 38 changes the elevation of the guide 37. The adjustment thus provided for is used primarily when the saw-blades are placed in position for the purpose of bringing the teeth to the proper place with respect to the path of the file, and, secondly, as a finer means of adjustment to so regulate the elevation of the blade that the file will do its work properly. With each backward stroke of the file there is a feeding action produced by the rotation of the wheel 9. On the shaft of the wheel 9 and directly over the groove of the saw-guide 27 is a one-toothed wheel. (Seen in detail in Fig. 4.) The tooth proper 40 is a loose piece held to the face of the head or wheel 41 and adjustable radially over the face of the wheel 41 which is fixed to the shaft of the wheel 9. The tooth 40 is readily adjusted so as to feed the saw forward one, two, or three teeth.

The bearing for the feed-wheel is adjustable both horizontally and vertically, and the two adjustments furnish the equivalent of a radial adjustment. The purpose of the adjustment is to produce in effect a feed-wheel of variable diameter, the diameter or perimetral path of the tooth 40 being varied, as just described; but the shaft of this one-toothed wheel is also the shaft of the wheel 9, and the wheel 9 must remain in mesh with the wheel 7 and the path of the outer end of the tooth 40, or the perimeter of the one-toothed wheel must be so adjusted as to engage with the saw-teeth. This requires a vertical adjustment of the shaft of wheel 41, and such vertical adjustment is furnished by sliding the hanger 42 under the bolt-head 44 on the rectangular hanger 45, one part of which rests on the frame and another part of which hangs from the first. With this vertical adjustment there must be a corresponding horizontal adjustment by sliding the hanger 45 on the frame under the bolt-head 43. The hole through the hanger 42 and the hole through the horizontal part of the hanger 45 are both elongated to allow of this adjustment.

A variation of the feeding device is shown in Fig. 5, where the head 41ª is slotted from the center toward one side, and in the slot is adjustably held a pin, upon which swings a pawl 42ª. With each revolution of the head 41ª the pawl 42ª will push the saw-blade forward, and the movement of the feed can be regulated within greater limits than in the first form shown.

Between the feeding mechanism and the file-frame are placed the setting-heads described in my previous patent.

On the cam-wheel 14 there is a re-entering curve between the arc of large diameter and the arc of small diameter, and this re-entering curve serves to catch the end of the arm 19 just before the file assumes its horizontal position, and thus prevents the file from striking against the saw with too great force.

What I claim is—

1. In a saw filing machine, the combination of a guide in which the saw moves freely, a file and means for adjusting the file to cut raking, a vise provided with jaws spaced to permit the reception therebetween of the saw guide and friction rollers terminating the ends of the vise jaws having their axes of rotation in the path of the file and adapted to hold the saw from vibration but to permit easy movement along the guide, substantially as described.

2. In a saw filing machine, the combination of a reciprocating file carrying frame, and means for holding the file therein, means whereby the file may be adjusted to cut raking, a saw guide in which the saw moves freely, a vise provided with jaws spaced to receive the saw guide, and friction rollers terminating the ends of the vise jaws and adapted to hold the saw from vibration, said vise being adjustable along the bed plate whereby the gripping points of the jaws may be set to accord with the position and rake of the file, substantially as described.

3. In a saw filing machine, the combination of a reciprocating file carrying frame, a saw guide, a vise provided with jaws placed to permit the insertion between them of said guide, friction rollers terminating the ends of the vise jaws and adapted to hold the saw from vibration, and vertically movable standards supporting said saw guide whereby the guide can be adjusted with respect to the roller terminals of the vise jaws, substantially as specified.

4. In a saw filing machine, the combination of a reciprocating file carrying frame, a file set therein to engage the saw, a saw guide, a vise adapted to hold the saw guide, rollers terminating the vise jaws having their axes of rotation in the path of the file and adapted to engage the saw above the guide and prevent vibration, but permit the saw to move readily along the guide, substantially as described.

5. In a saw filing machine, a one toothed wheel adapted to mesh with the saw as a rack and having its tooth adjustable radially, a driving pinion meshing with the main driving pinion, and means for shifting the shaft of the feed wheel both vertically and horizontally, whereby it is lifted while its driving pinion is continued in mesh with the main driving wheel, substantially as described.

In testimony whereof I sign this specification in the presence of two witnesses.

JOHN C. BALLEW.

Witnesses:
F. CLOUGH,
CHARLES F. BURTON.